US009010597B2

(12) United States Patent
Prescott et al.

(10) Patent No.: US 9,010,597 B2
(45) Date of Patent: Apr. 21, 2015

(54) HEADREST MOUNT FOR TABLET COMPUTER AND METHOD

(75) Inventors: Amy Prescott, Minneapolis, MN (US); Lawrence Zhou, Shanghai (CN); Roger Widner, Farmington, MN (US); Farhad Nourbakhsh, Apple Valley, MN (US); Kris Verstockt, Taipei (TW); Pei-Yun Yang, Taipei (TW)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 13/549,931

(22) Filed: Jul. 16, 2012

(65) Prior Publication Data

US 2013/0181492 A1 Jul. 18, 2013

Related U.S. Application Data

(60) Provisional application No. 61/508,378, filed on Jul. 15, 2011.

(51) Int. Cl.
*B60R 7/00* (2006.01)
*B60R 7/08* (2006.01)
*B60R 11/02* (2006.01)
*B60R 11/00* (2006.01)

(52) U.S. Cl.
CPC ............. *B60R 7/088* (2013.01); *B60R 11/0252* (2013.01); *B60R 2011/0017* (2013.01); *B60R 2011/0059* (2013.01); *B60R 2011/0073* (2013.01); *Y10S 224/929* (2013.01); *Y10S 248/917* (2013.01)

(58) Field of Classification Search
USPC ......... 224/275, 929, 545, 547, 558, 282, 197, 224/198, 199, 200; 248/917; 296/37.15; 297/188.04, 188.06; 379/446, 449, 379/379, 454, 455; 403/348, 349; 455/575.8, 575.9; D12/416; D14/253; 24/494, 505, 506, 517
See application file for complete search history.

(56) References Cited

U.S. PATENT DOCUMENTS

| 5,941,493 | A  | * | 8/1999 | Cheng ........................... 248/371 |
| 6,189,850 | B1 | * | 2/2001 | Liao et al. ................. 248/292.14 |
| 6,443,408 | B1 | * | 9/2002 | Hung ......................... 248/176.1 |
| 7,490,796 | B2 | * | 2/2009 | Kim ............................. 248/157 |
| 7,506,850 | B2 | * | 3/2009 | Chang ..................... 248/221.11 |

(Continued)

OTHER PUBLICATIONS

Brodit.Com, Product installation guide, www.brodit.com/monitering.jsp?anr=810520, Jun. 22, 2011.

(Continued)

*Primary Examiner* — Justin Larson
*Assistant Examiner* — Phillip Schmidt
(74) *Attorney, Agent, or Firm* — Beck Tysver Evans PLLC

(57) ABSTRACT

A device and method is presented that attaches a tablet computer to a vehicle headrest. A two-piece mount has a headrest coupling and a tablet housing. The tablet housing has a rigid core attached to a flexible rim portion that secures the tablet computer within the tablet housing. The rigid core has a circular cavity in the rear. The headrest coupling mounts to headrest posts in a vehicle using hinged arms and locking clips. The headrest coupling further has a circular attachment disk that fits within the circular cavity of the tablet housing. Retractable tabs in the circumference of the attachment disk fit within tracks in the walls of the circular cavity. The tabs prevent accidental separation of the tablet housing from the headrest coupling, and allow rotation of the tablet housing when attached to the headrest coupling.

15 Claims, 8 Drawing Sheets

(56) References Cited

U.S. PATENT DOCUMENTS

| | | | |
|---|---|---|---|
| D619,079 S * | 7/2010 | Bailo | D12/416 |
| 7,798,457 B2 * | 9/2010 | Chih et al. | 248/284.1 |
| 8,238,086 B2 * | 8/2012 | Ou | 361/679.21 |
| 8,382,059 B2 * | 2/2013 | Le Gette et al. | 248/460 |
| 2004/0079849 A1 * | 4/2004 | Rudolf | 248/276.1 |
| 2010/0229354 A1 * | 9/2010 | Werth | 24/485 |
| 2011/0006091 A1 * | 1/2011 | Schafer | 224/282 |
| 2012/0018471 A1 * | 1/2012 | Guillermo et al. | 224/275 |
| 2012/0091177 A1 * | 4/2012 | Ackeret et al. | 224/275 |
| 2012/0145843 A1 * | 6/2012 | Ho et al. | 248/176.3 |
| 2012/0312847 A1 * | 12/2012 | LaColla et al. | 224/275 |
| 2013/0107449 A1 * | 5/2013 | Su et al. | 361/679.56 |

OTHER PUBLICATIONS

Gripdaddymounts.Com, iPad Accessories/Headrest Mount, In-Car Tablet Computer Solutons, http://gripdaddymounts.com, 2010.

Ipadklet, Headrest Insert for iPad, www.ipadklet.com, 2010.

Proclipusa.Com, In-Vehicle Device Mounting Solutions, BMW 3-series/M3—Headrest Mount for Apple iPad, www.proclipusa.com/brodit-vehicle-mount/bmw-3-series/m3/headrest-mount-for-apple-ipad-810510-12894.aspx, 2011.

Toucoul.Com, Coulvue, http://toucoul.com/products/coulvue-headrest-car-mount, 2010.

* cited by examiner

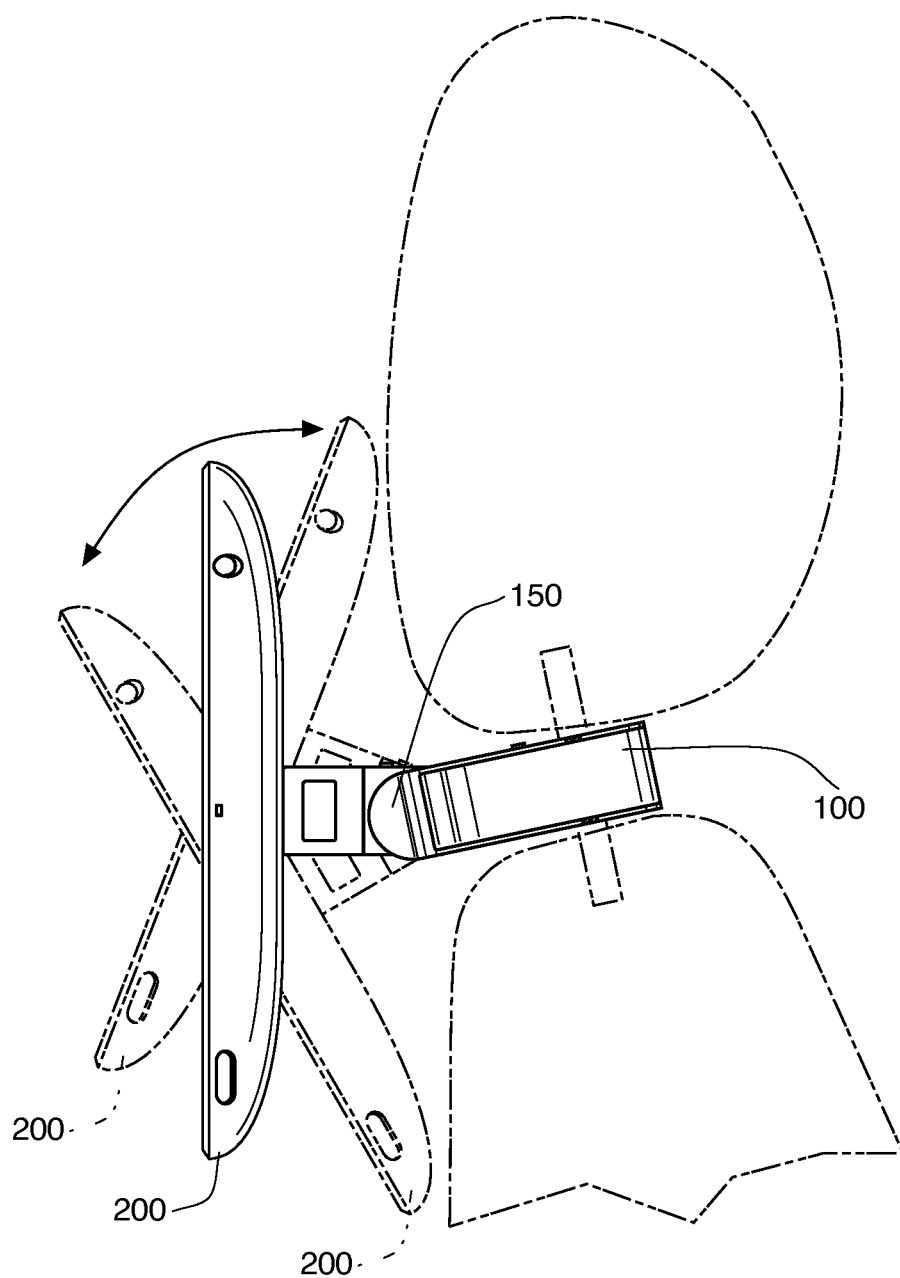

HEADREST MOUNT FOR TABLET COMPUTER AND METHOD

CROSS REFERENCE TO RELATED APPLICATION

This application claims the benefit of U.S. Provisional Application No. 61/508,378, filed Jul. 15, 2011, which is hereby incorporated by reference in its entirety.

FIELD OF THE INVENTION

The present invention relates to the field of in-vehicle entertainment. More particularly, the invention relates to a device that mounts a tablet computer onto the support posts of a vehicle headrest.

SUMMARY

One embodiment of the present invention utilizes a two-piece mount to attach a tablet computer to a vehicle headrest. The first piece constitutes a tablet housing, having a rigid core attached to a flexible outer rim portion. The flexible rim portion is sized so that it can stretch around the circumference of the tablet computer and hold the tablet securely within the tablet housing. The tablet housing is open in the front to allow full access to the front of the tablet, and smooth and thin at the back to allow the tablet computer to be comfortably used by a user while the tablet remains within the tablet housing. In effect, the tablet housing acts as a protective case for the tablet computer.

The tablet housing has a rigid core portion with a circular cavity in the rear. In the circumference of the circular cavity is a circular groove or channel. The tablet housing can be attached to the headrest coupling portion of the mount through this circular groove. The headrest coupling contains a circular attachment disk that fits within the circular cavity. On the edge of the attachment disk is at least one retractable tab that extends away from the attachment disk. This tab can be retracted to allow the attachment disk of the headrest coupling to be inserted into the circular cavity of the tablet housing. The tab can be extended into the groove within the circumference of the circular cavity. The tab interacts with the groove to prevent the tablet housing from falling off of the attachment disk of the headrest coupling. In one embodiment, the tablet housing can rotate with respect to the headrest coupling, with the tab of the attachment disk rotating within the groove of the circular cavity. Stops within the groove of the circular cavity can limit the rotation of the tablet housing. In the preferred embodiment, the tab allows the tablet housing to rotate ninety degrees from a horizontal position to a vertical position.

The headrest coupling uses two hinged arms to lock the headrest coupling to the post of the headrest in the vehicle. A toothed gripping surface on the interior of the hinged arms and the exterior of the base of the headrest coupling help prevent the headrest post from slipping, while a locking clip tightly holds the hinged arms in place.

BRIEF DESCRIPTION OF THE DRAWINGS

FIG. 11 is a right plan view of a headrest mount showing the tilted positions of the tablet housing in phantom.

DETAILED DESCRIPTION OF THE INVENTION

Figure 1:
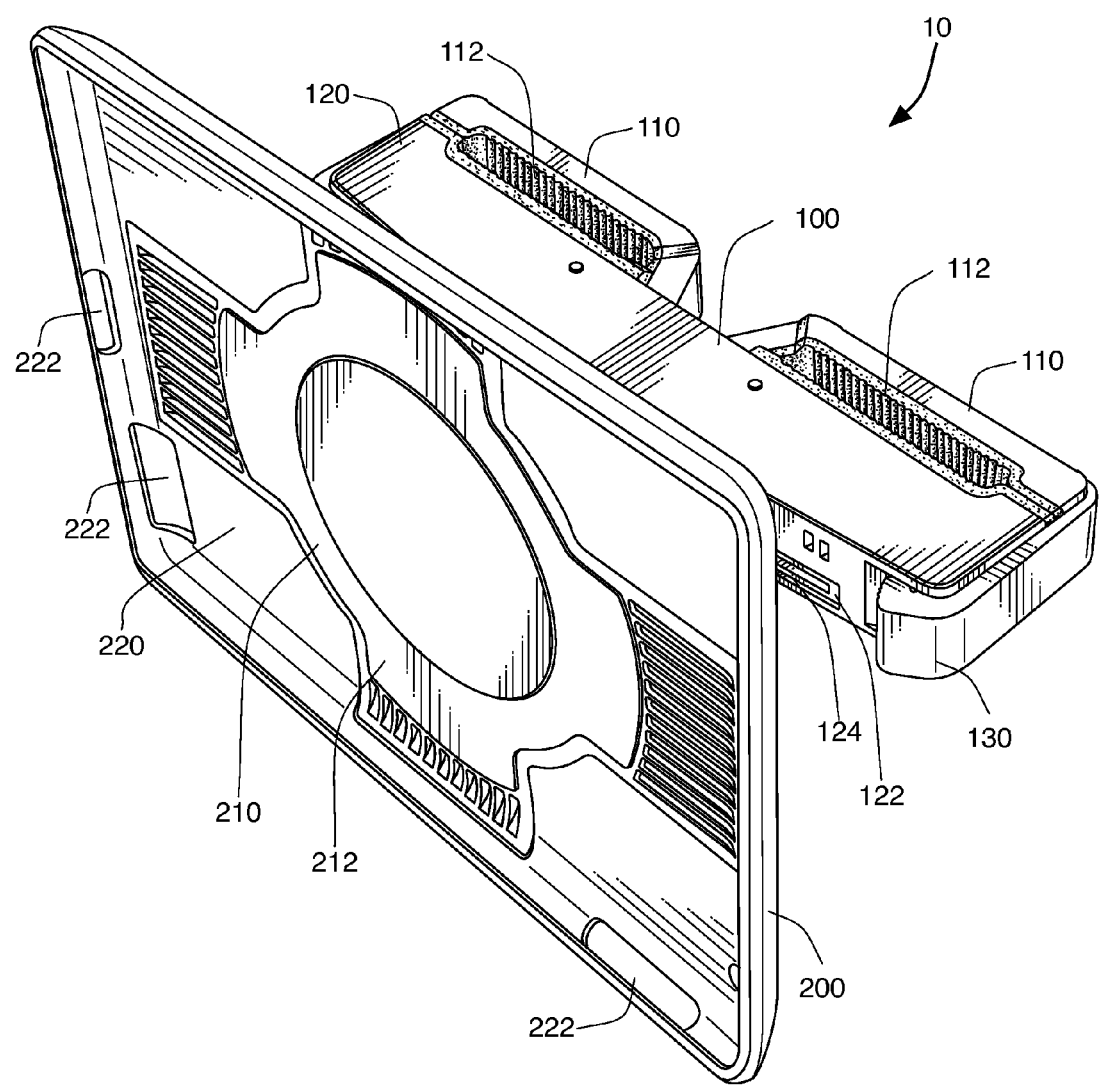
FIG. 1 is a perspective view of one embodiment of a headrest mount for a tablet computer.

FIG. 1 shows one embodiment of a headrest mount 10 for a tablet computer. The mount 10 consists of two separable elements. The first element is the headrest coupling 100, which attaches the mount 10 to the headrest support poles (not shown). The second element is the tablet housing 200, which serves to hold and protect the tablet computer (also not shown). The headrest coupling 100 utilizes two hinged arms 110, each of which rotates about a hinge mounted in the main body 120 of the headrest coupling 100. Inside each hinged arm 110 is a toothed gripping surface 112 formed of a rubber or rubber-like synthetic compound. The surface 112 has individual ridges or teeth to help hold the headrest support posts when the headrest mount 10 is positioned within a vehicle. The toothed gripping surface 112 is also found on the corresponding exterior surface of the main body 120, as shown in FIG. 1, so as to surround the headrest post with the surface 112 on two sides. The hinged arms 110 are held closed by clip 130 located on the two ends of the elongated main body 120.

The main body 120 of the headrest coupling 100 will preferably also have constructed into it a power plug holder 122. In the disclosed embodiment, this holder 122 is a recess in the main body 120. Inside this recess is a plug made out of an elastic rubber or rubber-like synthetic compound, with this plug itself containing an interior recess 124. The interior recess 124 in the plug holder 122 is sized and shaped to receive a portion of a charging cable used to charge the tablet computer that is mounted into the headrest mount 10. In the embodiment shown in FIG. 1, the interior recess has an elongated, narrow cross-section, designed to receive a plug that is itself inserted into the tablet computer.

The tablet housing 200 is itself constructed of two primary components, namely a rigid core 210 and a flexible rim or exterior 220. In the preferred embodiment, the rigid core 210 is formed out of a rigid plastic and has flanges 212 to help secure the core 210 to the rim 220. The flexible rim 220 is formed from a rubber or rubber-like synthetic compound that allows the rim 220 to be slightly stretched and then return to its original shape. The rim 220 preferably contains a plurality of apertures or tablet control access ports 222 near the outer periphery of the rim 220. These ports 222 are sized and located to allow access to control buttons and interfaces of the tablet computer when the tablet is inserted into the tablet housing 200.

Figure 2:
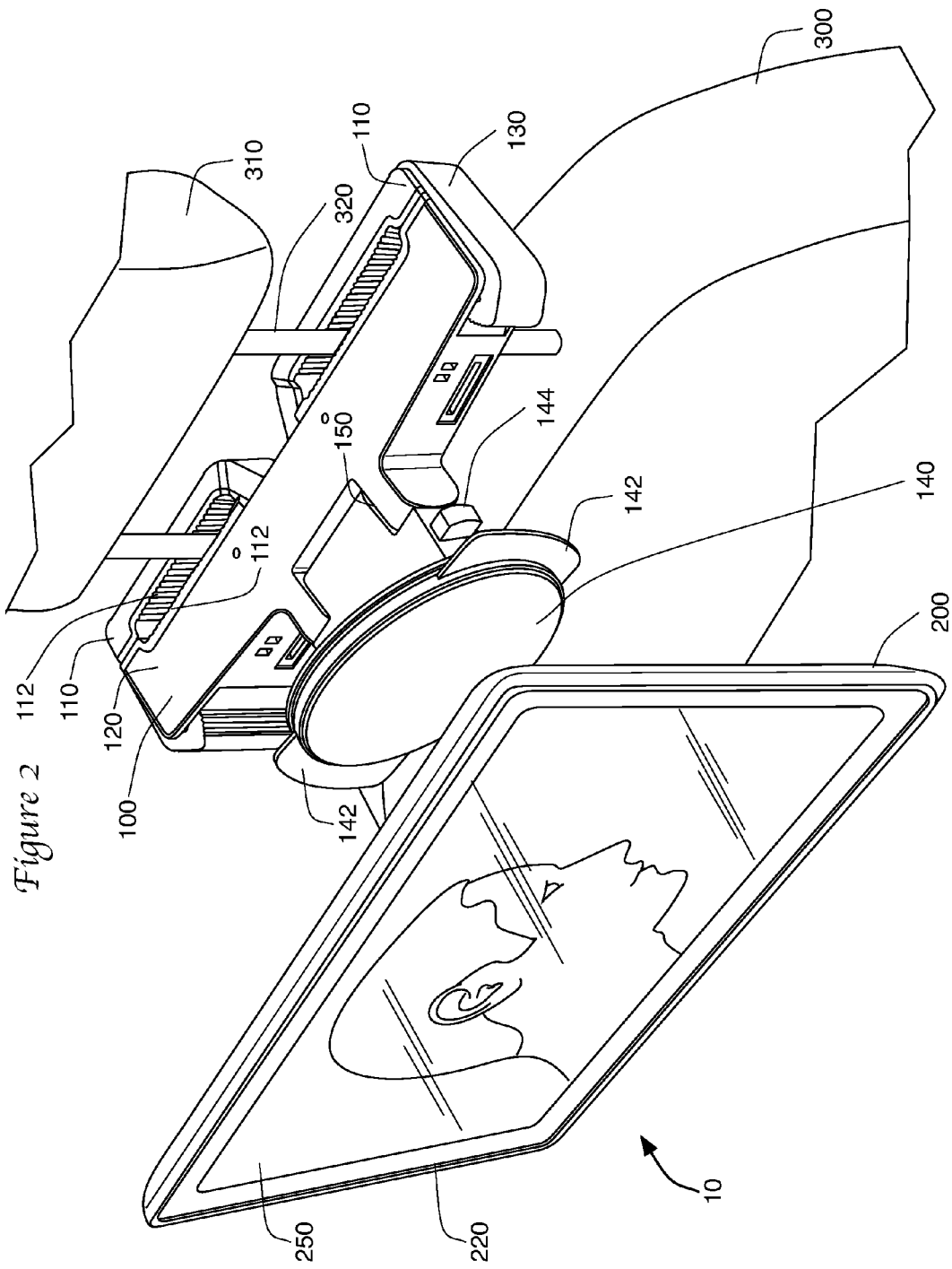
FIG. 2 is an exploded, perspective view the headrest mount of FIG. 1.

FIG. 2 shows the headrest mount 10 with the headrest coupling 100 separated from the tablet housing 200. In this figure, headrest coupling 100 is attached to posts 320 that extend between a vehicle seat 300 and the seat's headrest 310. The hinged arms 110 of the headrest coupling 100 each wrap around one of the posts 320, trapping the posts 320 between the toothed gripping surface 112 of the arms 110 and the toothed gripping surface 112 found on the body 120 of the headrest coupling 100. The locking clips 130 are in the closed position, preventing the hinged arms 110 from moving and compressing the arms 110 against the posts 320.

The headrest coupling 100 attaches to the tablet housing 200 via an attachment disk 140 that extends from the main body 120 of the coupling 100. In one embodiment, the attachment disk 140 connects to the body 120 via a hinge 150, which allows the attachment disk 140 to tilt up and down. Two retractable tabs 142 extend from the edges of the attachment disk 140, to help hold the attachment disk to the rigid core 210 of the tablet housing 200, as is described in more detail below in connection with FIG. 7. The retraction buttons 144 (only one shown in FIG. 2) that are located proximal to the retractable tabs 142 operate to retract the tabs 142 whenever the buttons 144 are pressed inward. Springs within the headrest coupling 100 re-extend the tabs 142 and the buttons 144 when pressure is removed from the buttons 144.

Figure 3:
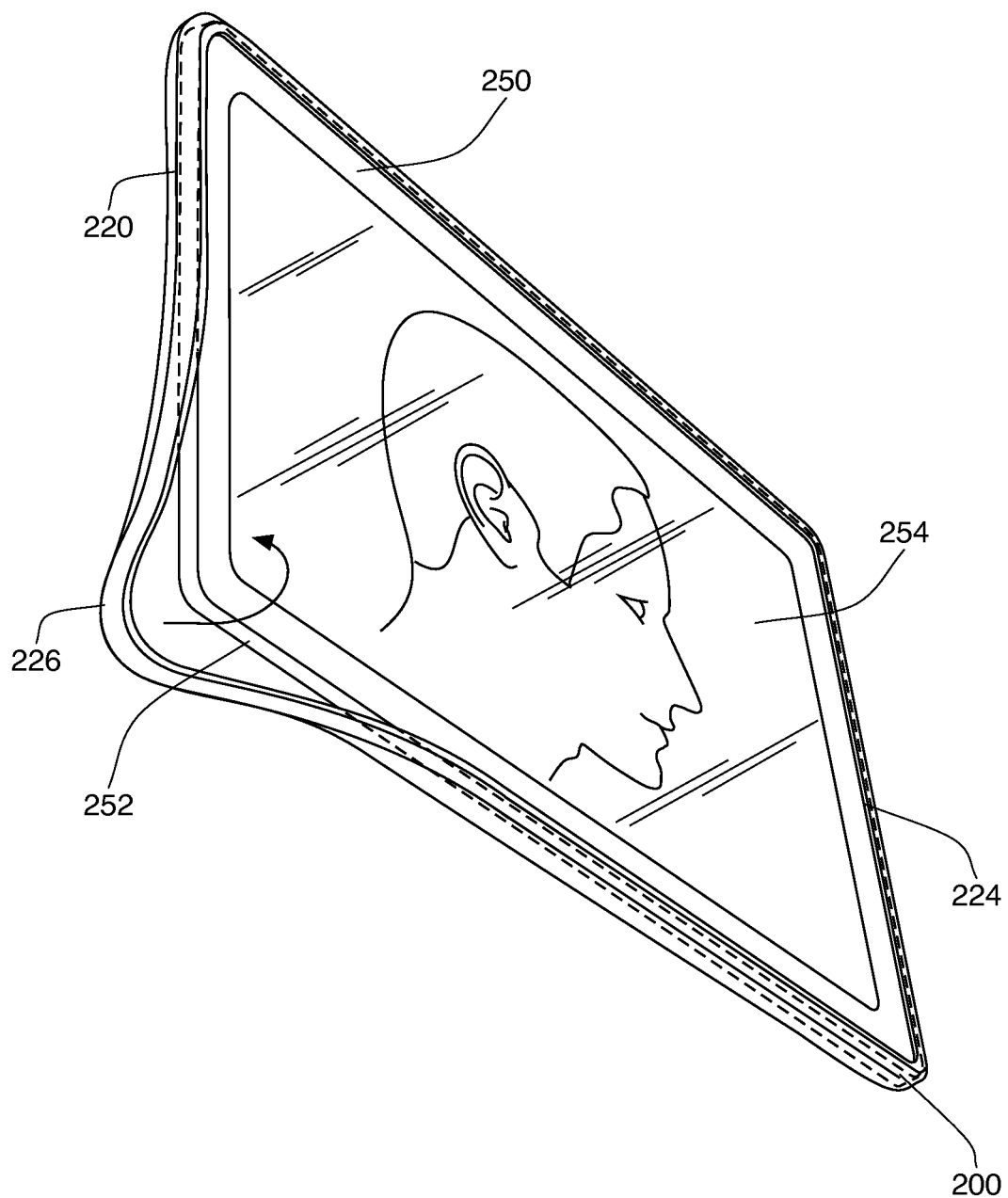
FIG. 3 is a perspective view of a tablet housing containing a tablet computer.

The tablet housing 200 is shown with a tablet computer 250 held in place by the flexible rim 220 of the tablet housing 200. The tablet computer 250 can be any relatively flat device with a display screen that can be used in a vehicle to present entertainment programming, play games, or run applications. Examples of existing tablet computers 230 include the Apple iPad devices (from Apple Inc. of Cupertino, Calif.) and tablet computers running the Android operating system from Google Inc. (Mountain View, Calif.). The tablet 250 is inserted into the tablet housing 200 by stretching the flexible rim 220 around the circumference 252 of the tablet 250, as shown in FIG. 3. During normal insertion, one side of the tablet 250 is first positioned within the flexible rim 220 so an inward facing ridge 224 on the rim 220 extends slightly over the front face 254 of the circumference 252 of the tablet computer 250. The final corner 226 of the flexible rim 220 is then stretched around the last corner of the tablet 250, ensuring that the tablet is securely held by the tablet housing 200. The rubber or rubber-like consistency of the flexible rim 220 helps protect the tablet computer 250 in case of accidental drops, even if the tablet 250 were to fall flat on its face 254. In addition, the flexible rim 220 provides a comfortable grip for users when the combination tablet 250 and tablet housing 200 are used in hand-held mode separated from the headrest coupling 100.

In other embodiments, the flexible rim 220 is replaced by any known technique for securing a tablet computer 250, such as straps, elastic bands, moveable bars, and the like. In these embodiments, the headrest coupling 100 may still attach to the tablet housing 200 through the rigid core 210. It is not necessary that the tablet computer 250 be secured by stretching the elastic rim 220 around the computer as long as some attachment mechanism is used by the tablet housing 200 to secure the tablet 250.

Figure 4:
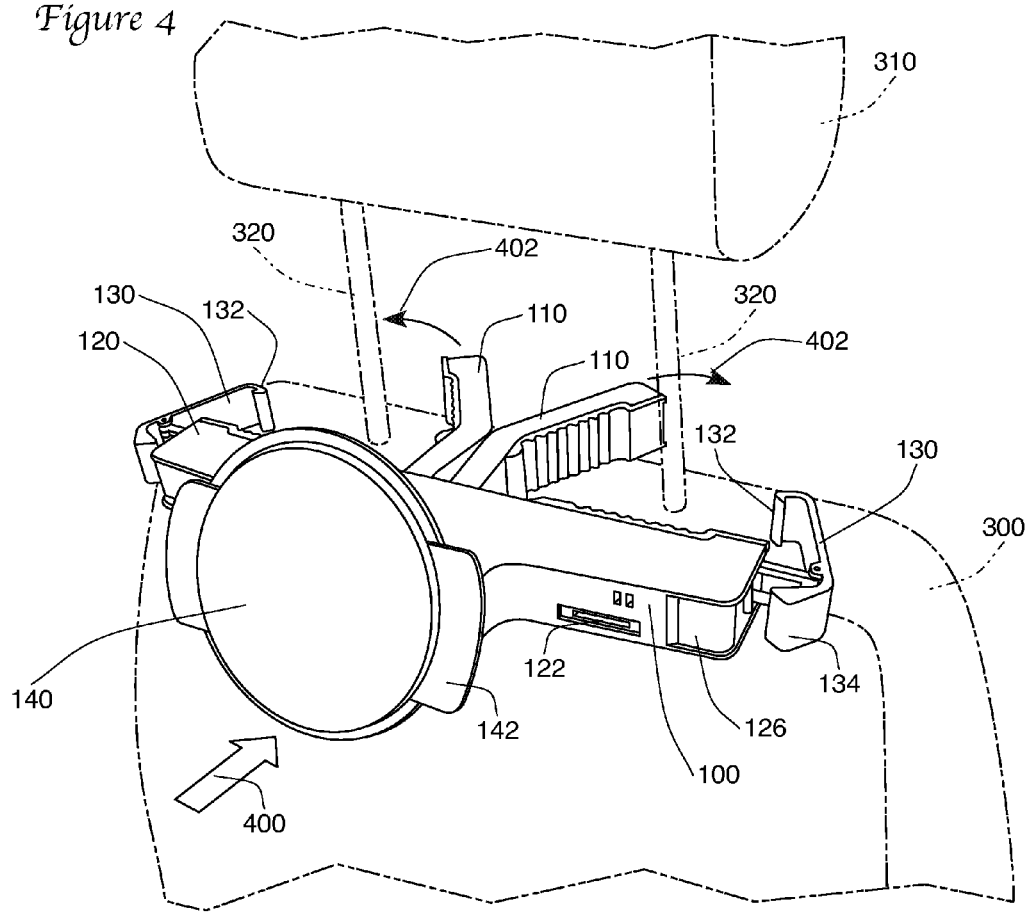
FIG. 4 is a perspective view of a headrest coupling being attached to the headrest poles of a vehicle headrest.
Figure 5:
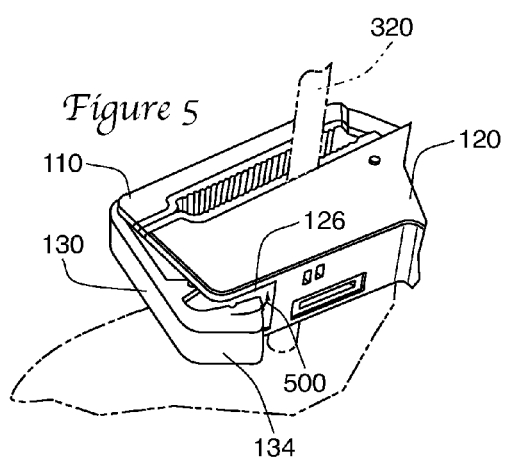
FIG. 5 is a perspective view of a left attachment mechanism of a headrest coupling.
Figure 6:
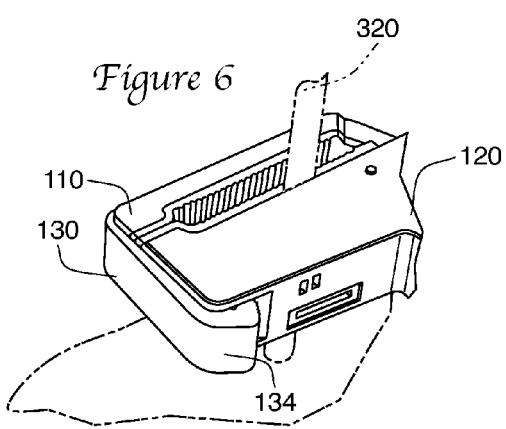
FIG. 6 is a view of the attachment mechanism of FIG. 5, with a closed locking clip.

FIG. 4 shows the process that is used to attach the headrest coupling 100 to the posts 320 of the vehicle headrest 310. The locking clips 130 are released, allowing the hinged arms 110 to open. The arms 110 open wide enough to allow the arms to pass between the two headrest poles 320 while the headrest coupling 100 is moved forward below the headrest 310, as indicated by the arrow 400 in FIG. 4. Once the body 120 of the headrest coupling 100 is adjacent the poles 320, the hinged arms 110 are closed around the poles 320 as indicated by arrows 402. When the arms 110 are closed, the locking clips 130 are used to secure the arms 110 in a closed position. Each locking clip 130 has a projection 132 that is received in an indentation (not shown) on the hinged arm 110. This prevents that portion of the clip 130 from moving with respect to the hinged arm 110 during the locking action. On the opposite end of the clip 130 from the projection 130 is the base portion 134 of the locking clip. The base portion 134 is sized and positioned to be received by an engaging depression 126 in the base 120 of the headrest coupling 100. As shown in FIG. 5, the hinged arm 110 is held closed by the projection 132 of the clip, while the based is pulled over (arrow 500) to be received by the engaging depression 126. The closed clip 130 is shown in FIG. 6. Preferably, the natural opening between the toothed gripping surface 112 on the hinged arm 110 and the toothed gripping surface 112 on the base 120 of the headrest coupling 100 is sized to be smaller than most or all anticipated headrest posts 320. In this way, the gripping surfaces 112 will be compressed against the post 320, preventing the post 320 from moving relative to the headrest coupling 100 when the clip 130 is closed. The clip 130 can be unlocked by simply pushing the base portion 134 away from the body 120 of the headrest coupling 100.

Figure 7:
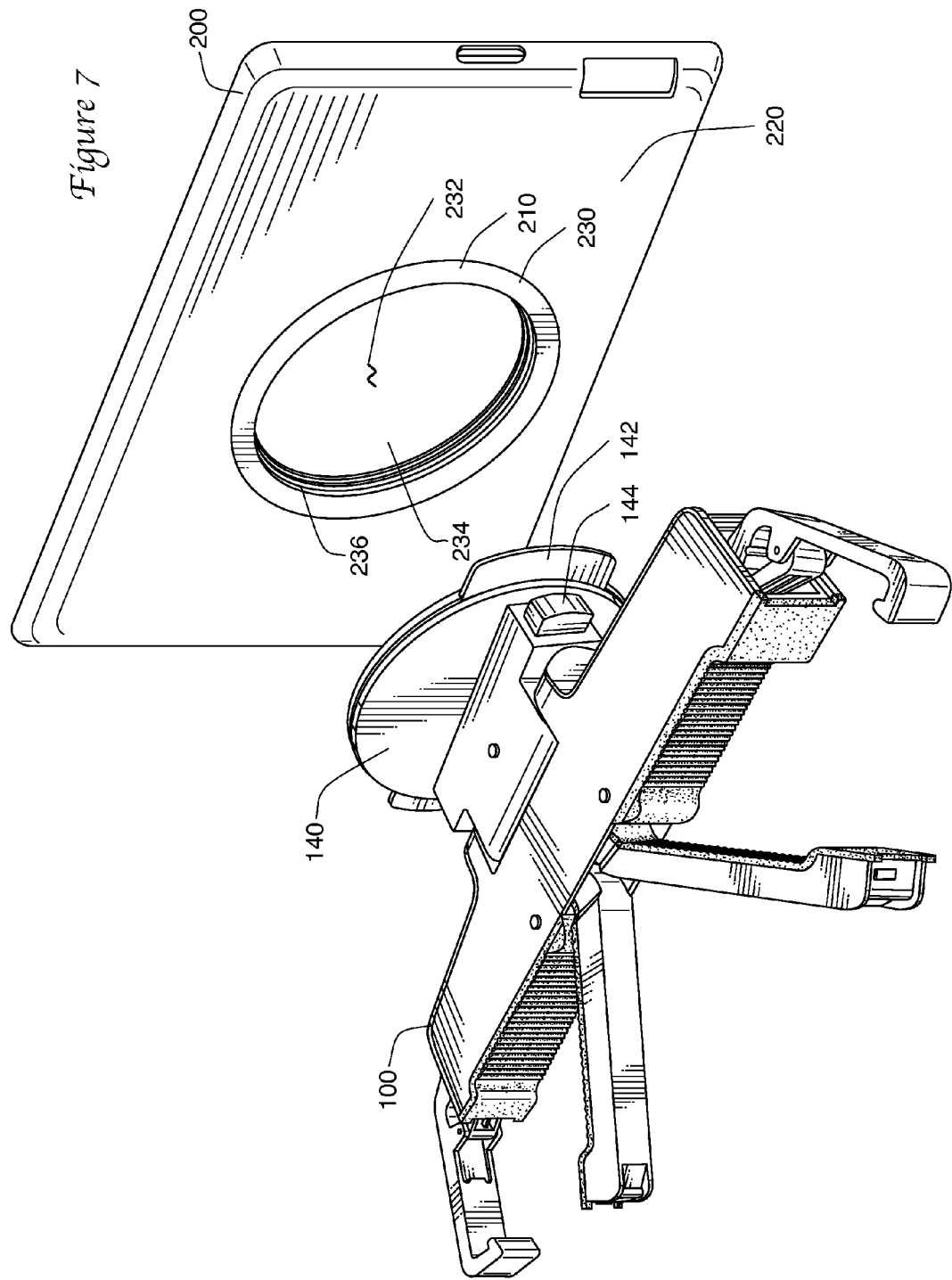
FIG. 7 is an exploded view of the headrest mount of FIG. 3, showing the rear of the tablet housing.

The mechanism for attaching the headrest coupling 100 to the tablet housing 200 is shown in FIG. 7. As described above, the headrest coupling 100 has a rigid core 210 preferably constructed of hard plastic. The front portion of this core 210 shown in FIG. 1 includes a plurality of flanges 212 that help secure the rigid core 210 to the flexible rim 220. The rear portion of the core 210 has a circular wall 230 as shown in FIG. 7. This circular wall 230 surrounds a circular cavity 232. The back surface 234 of the cavity 232 is still part of the rigid core 210. Along the circular circumference of cavity 232 is a circular track 236, which is essentially a thin, uniform indentation or channel in the wall 230 of cavity 232. The track 236 is located approximately halfway into the cavity 232.

Figure 8:
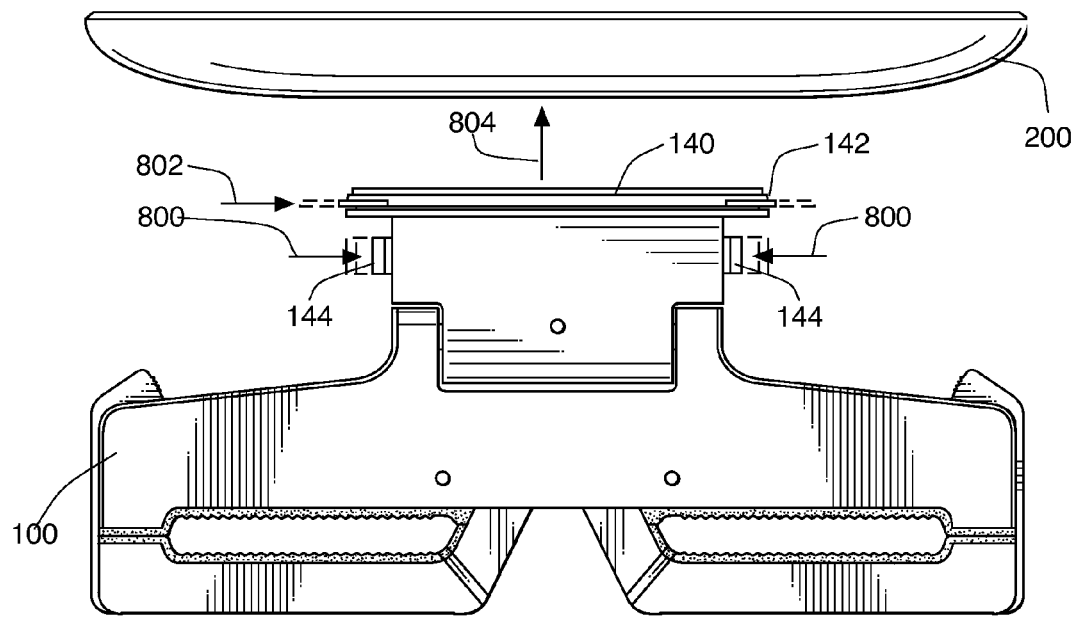
FIG. 8 is an exploded, top plan view of a headrest mount.

The attachment disk 140 of the headrest coupling 100 also has a circular shape, and is designed to be received within the circular cavity 232 of the rigid core 210 of the tablet housing 200. When the retraction buttons 144 are pushed, the tabs 142 of the attachment disk 140 are retracted, and the attachment disk 140 may then be inserted into the cavity 232. This is shown in FIG. 8, where pressing of the buttons 144 (arrow 800) causes retraction of the tabs (arrow 802), thereby allowing the attachment disk 140 to be inserted into the cavity 232 of the tablet housing 200 (arrow 804).

Figure 9:
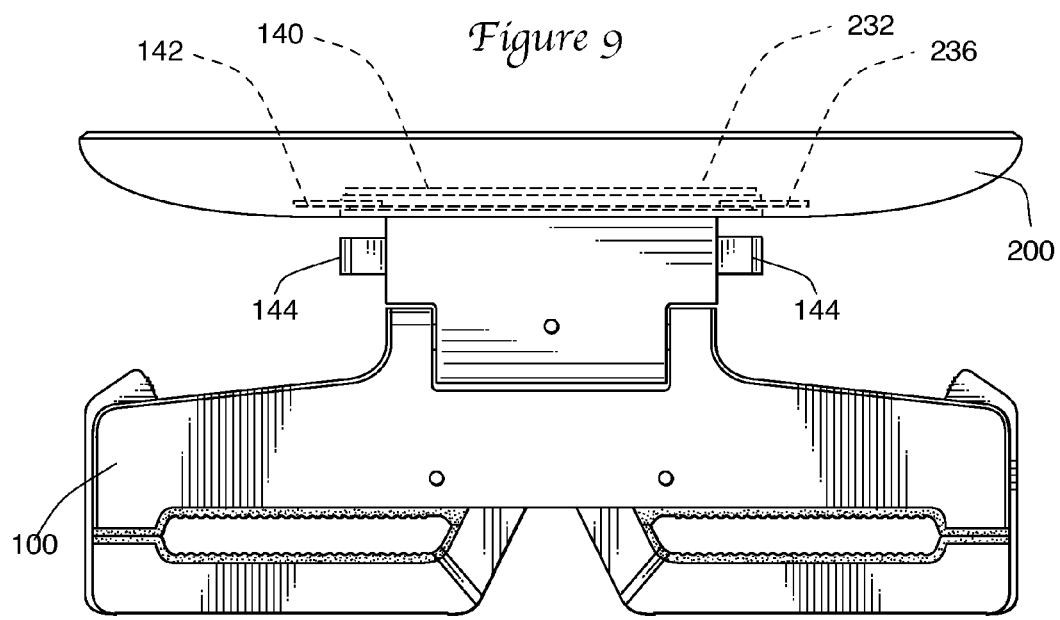
FIG. 9 is the top plan view of the headrest mount with the tablet housing attached to the headrest coupling.

When the retraction buttons 144 are released, the retractable tabs 142 re-extend into the track 236 of the circular wall 230. The engagement between the tabs 142 and this track 236 prevents the headrest coupling 100 from being removed from the tablet housing 200 until the retraction buttons 144 are pressed again. This engagement is shown in FIG. 9, where the attachment disk 140 has been successfully inserted into the cavity 232, with the retractable tabs 142 extended into the circular channel 236.

Figure 10:
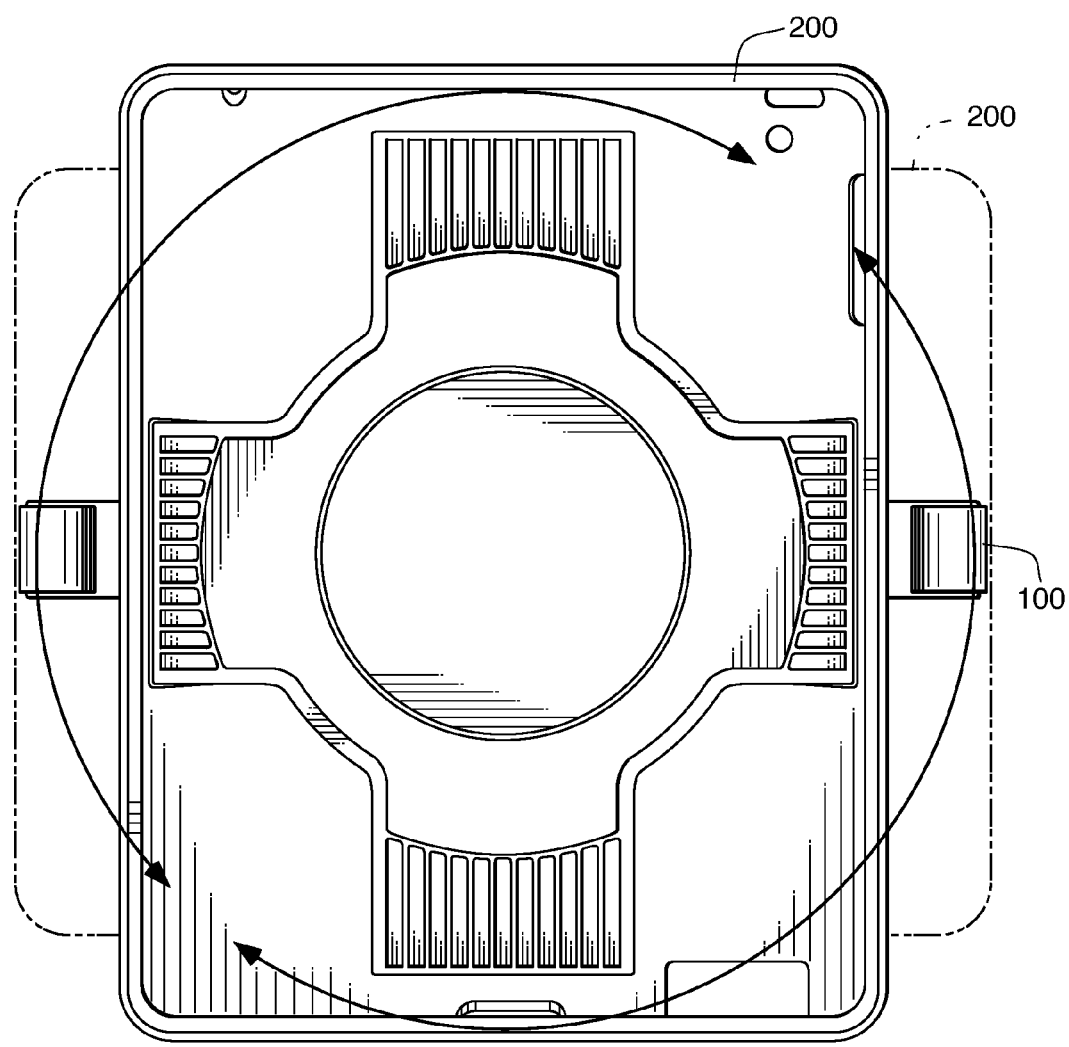
FIG. 10 is a front plan view of a headrest mount showing the rotational position of a tablet housing in phantom.

In the preferred embodiment, the track 236 extends along the wall 230 more than is necessary to receive the length of the retractable tabs 142. This allows the tablet housing 200 to be rotated with respect to the headrest coupling 100, with the tabs 142 sliding within the tracks 236 without danger of the tabs 142 falling out of the tracks 236 and decoupling the attachment disk 140 from the tablet housing 200. To assist in this rotation, the tabs 142 have an arcuate shape that is shaped to match the inner diameter of the track 236. In the preferred embodiment, the track 236 does not extend through the whole circumference of the circular wall 230 uninterrupted. This means that the tablet housing 200 may not rotate completely when attached to the attachment disk 140 of the headrest coupling 100. Instead, stops within the tracks 236 (or the end of the track 236 itself) limits this rotation to ninety degrees. By careful placement of the stops or ends of the track, the rotation is preferably bounded by positions where the rectangular tablet housing 200 is presented in horizontal and vertical positions relative to the elongated body 120 of the headrest coupling 100. Careful manufacture of the track 236 also allows a frictional engagement at these two positions, thereby preventing drift or accidental movement away from the horizontal or vertical positions while still allowing rotation when desired by the user. This is shown in FIG. 10, wherein the tablet housing 200 is shown in a vertical position with respect to the headrest coupling 100, and arrows show how the tablet housing 200 can be rotated into a horizontal position (shown in phantom).

In one embodiment, the attachment disk 140 is connected to the body 120 of the headrest coupling 100 through a hinge 150. As shown in FIG. 11, the hinge 150 allows the tablet housing 200 and the tablet computer 250 to tilt upward and downward when the tablet housing 200 is mounted to the headrest coupling 100.

One advantage of attaching the headrest coupling 100 to the tablet housing 200 through the attachment disk 140 and circular cavity 232 is the ease with which the two components 100, 200 can be separated. Even after mounting in a vehicle, a user can simply press the retraction buttons 144 and pull the tablet computer 250 and tablet housing 200 off of the headrest coupling 100. Since the tablet housing 200 takes the form of a protective cover for the tablet computer 250, the tablet 250 can comfortably be used in the user's hands or lap without removing the tablet 250 from the tablet housing 200. Temporary handheld use is therefore possible. When the tablet 250 needs to be remounted, the retraction buttons 144 are pressed, and the tablet housing 200 is reattached to the attachment disk 140.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for mounting a tablet computer to a vehicle headrest comprising:
   (a) attaching a headrest coupling to the vehicle headrest;
   (b) coupling a tablet housing to the tablet computer; and
   (c) attaching the tablet housing to the headrest coupling by
      (i) retracting at least one retractable tab found on a circumference of a circular attachment disk of the headrest coupling,
      (ii) inserting the circular attachment disk of the headrest coupling into a circular cavity of the tablet housing,
      (iii) extending the retractable tab into a track found in a wall of the circular cavity of the tablet housing; and
   (d) while the tablet housing is attached to the headrest coupling, rotating the tablet housing relative to the headrest coupling, thereby causing the retractable tab to slide within the track; and
   (e) stopping the rotation of the tablet housing with respect to the headrest coupling at at least one known location by locating a stop in the track to prevent further rotation of the retractable tab within the track when the tablet housing is at the known location.

2. The method of claim 1, wherein two retractable tabs located on opposite sides of the circumference of the circular attachment disk are retracted and then extended into the track.

3. The method of claim 2, wherein the retractable tabs are retracted by pushing at least one retraction button that is engaged with the retractable tabs.

4. The method of claim 1, wherein the headrest coupling is elongated horizontally when attached to the headrest, wherein the rotation of the tablet housing is stopped by two stops within the track with the tablet computer in a horizontal position at the first stop and in a vertical position at the second stop.

5. The method of claim 1, wherein the headrest coupling is attached to the vehicle headrest.

6. A headrest mount that mounts a tablet computer to a vehicle headrest comprising:
   (a) a headrest coupling that includes a coupling mechanism for securing the headset coupling to the headrest having and an attachment disk with a circular circumference;
   (b) a tablet housing having
      (i) a tablet attachment portion for retaining the tablet computer and
      (ii) a core attached to the attachment portion, the core having a circular wall defining a cavity, the cavity sized to contain the attachment disk of the headrest coupling; and
   (c) an attachment mechanism that secures the attachment disk of the headrest coupling within the cavity of the core of the tablet housing, the attachment mechanism comprising
      (i) a track within the circular wall of the tablet housing core, and
      (ii) a tab on the circular circumference of the attachment disk positioned to extend into the track when the attachment disk is secured within the cavity of the core of the tablet housing, allowing the attachment disk to rotate within the tablet housing core along the track,
   wherein the track contains at least one stop that limits rotation of the tablet housing to ninety degrees.

7. The headrest mount of claim 6, wherein the tab retracts to a retracted position within the attachment disk and extends to an extended position beyond the circular circumference of the attachment disk, wherein the tab secures the attachment disk within the cavity of the core of the tablet housing when the tab is in the extended position and extending into the track, and further wherein the tablet housing can be separated from the headrest coupling when the tab is in the retracted position, wherein the attachment mechanism further comprises:
   iii) a retraction button on the headrest coupling that is mechanically engaged with the retractable tab to cause movement of the retractable tab between the extended and retracted positions.

8. The headrest mount of claim 7, wherein the tab is slidably engaged in the track to allow the tablet housing to rotate with respect to the headrest coupling by rotating the circular wall of the tablet housing around the attachment disk of the headrest coupling.

9. The headrest mount of claim 8, wherein the tab has an arcuate shape matching a diameter of the track.

10. The headrest mount of claim 6, wherein the track is manufactured to frictionally engage the tab when the tab is adjacent the at least one stop and not frictionally engage the tab when the tab is not adjacent the at least one stop.

11. The headrest mount of claim 10, further comprising a second tab located on the circular circumference of the attachment disk, the two tabs being located opposite one another on the circumference of the attachment disk.

12. The headrest mount of claim 6, wherein the headrest coupling further comprises:
   i) two hinged arms, and
   ii) a locking clip for each hinged arm to lock the hinged arm in a closed position and to unlock the hinged arm allowing the hinged arm to open.

13. The headrest mount of claim 6, wherein core is comprised of a rigid material and wherein the tablet attachment portion comprises a flexible rim attached to the rigid core, the flexible rim stretching around a circumference of the tablet computer for retaining the tablet computer to the tablet housing.

14. The headrest mount of claim 6, further comprising a recess in the headrest coupling to secure a power cord configured to power the tablet computer.

15. The headrest mount of claim 14, wherein the recess contains a plug with an interior recess, the interior recess being sized to retain the power cord, and further wherein the plug is comprised of an elastic compound.

\* \* \* \* \*

UNITED STATES PATENT AND TRADEMARK OFFICE
CERTIFICATE OF CORRECTION

| | | |
|---|---|---|
| PATENT NO. | : 9,010,597 B2 | Page 1 of 1 |
| APPLICATION NO. | : 13/549931 | |
| DATED | : April 21, 2015 | |
| INVENTOR(S) | : Amy Westendrop et al. | |

It is certified that error appears in the above-identified patent and that said Letters Patent is hereby corrected as shown below:

Title page

Item (12), Delete "Prescott" and insert --Westendrop--.

Item (75), Inventors: Delete "Amy Prescott" and insert --Amy Westendrop--, therefor.

In the Claims

Column 5, Line 58
Delete "at at least" and insert --at least--, therefor.

Column 6, Line 13
Delete "headrest having" and insert --headrest--, therefor.

Signed and Sealed this
Twelfth Day of April, 2016

Michelle K. Lee
*Director of the United States Patent and Trademark Office*